United States Patent
Yu et al.

(10) Patent No.: US 11,188,705 B2
(45) Date of Patent: Nov. 30, 2021

(54) PIN ACCESSIBILITY PREDICTION ENGINE

(71) Applicant: Synopsys, Inc., Mountain View, CA (US)

(72) Inventors: Tao-Chun Yu, Taipei (TW); Hsien-Shih Chiu, Taipei (TW); Shao-Yun Fang, Taipei (TW); Kai-Shun Hu, Taipei (TW); Philip Hui-Yuh Tai, Cupertino, CA (US); Cindy Chin-Fang Shen, Taipei (TW); Henry Sheng, Mountain View, CA (US)

(73) Assignee: Synopsys, Inc., Mountain View, CA (US)

(*) Notice: Subject to any disclaimer, the term of this patent is extended or adjusted under 35 U.S.C. 154(b) by 0 days.

(21) Appl. No.: 16/875,844

(22) Filed: May 15, 2020

(65) Prior Publication Data
US 2020/0364394 A1 Nov. 19, 2020

Related U.S. Application Data

(60) Provisional application No. 62/849,321, filed on May 17, 2019.

(51) Int. Cl.
*G06F 30/30* (2020.01)
*G06F 30/27* (2020.01)
(Continued)

(52) U.S. Cl.
CPC ........... *G06F 30/398* (2020.01); *G06F 30/27* (2020.01); *G06F 30/3953* (2020.01); *G06F 16/90335* (2019.01); *G06F 30/30* (2020.01); *G06F 2111/04* (2020.01); *G06F 2111/20* (2020.01); *G06N 3/0472* (2013.01); *G06N 3/08* (2013.01)

(58) Field of Classification Search
None
See application file for complete search history.

(56) References Cited

U.S. PATENT DOCUMENTS 5,544,067 A * 8/1996 Rostoker ........ G01R 31/318378
703/14
5,946,673 A * 8/1999 Francone ................. B25J 9/163
706/13

(Continued)

OTHER PUBLICATIONS

Q. Zhou et al., "An Accurate Detailed Routing Routability Prediction Model in Placement," 6th Asia Symposium on Quality Electronic Design, 2015 IEEE, pp. 119-122. (Year: 2015).*

(Continued)

*Primary Examiner* — Leigh M Garbowski
(74) *Attorney, Agent, or Firm* — Jaquez Land Greenhaus & McFarland LLP; Bruce W. Greenhaus, Esq.

(57) ABSTRACT

An efficient electronic structure for circuit design, testing and/or manufacture for validating a cell layout design using an intelligent engine trained using selectively arranged cells selected from a cell library. An initial design rule violation (DRV) prediction engine is initially trained using a plurality of pin patterns generated by predefined cell placement combinations, where pin patterns are pixelized and quantified and is classified as either (i) a DRV pin pattern (i.e., pin patterns likely to produce a DRV) or (ii) a DRV-clean pin pattern (i.e., pin patterns unlikely to produce a DRV).

21 Claims, 16 Drawing Sheets

(51) Int. Cl.
G06F 30/398 (2020.01)
G06F 30/3953 (2020.01)
*G06N 3/08* (2006.01)
*G06F 111/04* (2020.01)
*G06F 16/903* (2019.01)
*G06F 111/20* (2020.01)
*G06N 3/04* (2006.01)

(56) References Cited

U.S. PATENT DOCUMENTS

| | | | | |
|---|---|---|---|---|
| 6,260,179 | B1 * | 7/2001 | Ohsawa | G06F 30/392 |
| | | | | 716/112 |
| 9,690,898 | B2 * | 6/2017 | Graur | G06F 30/39 |
| 10,083,269 | B2 | 9/2018 | De Dood et al. | |
| 10,192,016 | B2 * | 1/2019 | Ng | G06F 30/327 |
| 10,268,795 | B2 * | 4/2019 | Chuang | G06F 30/398 |
| 10,699,055 | B2 * | 6/2020 | Sha | G06F 30/27 |
| 10,808,333 | B2 * | 10/2020 | Ito | G06F 30/327 |
| 2020/0134119 | A1 | 4/2020 | Sio et al. | |

OTHER PUBLICATIONS

W.-T. J. Chan et al., "BEOL Stack-Aware Routability Prediction from Placement Using Data Mining Techniques," 2016 IEEE 34th Int'l Conference on Computer Design (ICCD), pp. 41-48. (Year: 2016).*

W.-T. J. Chan et al., "Routability Optimization for Industrial Designs at Sub-14nm Process Nodes Using Machine Learning," 2017 ACM ISPD '17, pp. 15-21. (Year: 2017).*

I. Kang et al., "Fast and Precise Routability Analysis with Conditional Design Rules," 2018 Association for Computing Machinery, SLIP'18, 8 pages. (Year: 2018).*

A. F. Tabrizi et al., "A Machine Learning Framework to Identify Detailed Routing Short Violations from a Placed Netlist," ACM DAC 2018, pages. (Year: 2018).*

Tabrizi, et al., "Detailed Routing Violation Prediction During Placement Using Machine Learning", IEEE 2017, 4 pgs.

Xie, et al., "RouteNet: Routability Prediction for Mixed-Size Designs using Convolutional Neural Network", ICCAD '18, Nov. 5-8, 2018, 8 pgs.

Huang, et al., "Routability-Driven Macro Placement with Embedded CNN-Based Preduction Model", EDAA, 2019, pp. 180-185.

Zeng, et al., "Design Rule Violation Hotspot Prediction Based on Neural Network Ensembles", University of Wisconsin—Madison, Nov. 9, 2018, 6 pgs.

Xu, et al., "Concurrent Pin Access Optimization for Unidirectional Routing", DAC '17, Jun. 18-22, 2017, Austin, TX, 6 pgs.

Xu, et al., "Standard Cell Pin Access and Physical Design in Advanced Lithography",University of Texas at Austin, (date), 13 pgs.

* cited by examiner

PIN ACCESSIBILITY PREDICTION ENGINE

CROSS-REFERENCE TO RELATED APPLICATIONS—CLAIM OF PRIORITY

The present application claims priority to U.S. provisional Patent Application No. 62/849,321, filed on May 17, 2019, for a "Pin Accessibility Prediction Engine", which is herein incorporated by reference in its entirety.

BACKGROUND

(1) Technical Field

This disclosure relates to the field of electronic design automation in general. More specifically, the present disclosure relates to design rule checking, including the implementation of a pin accessibility predictor engine.

(2) Background

As process nodes continue to be scaled down, standard cells have become much smaller. In addition, cell counts have been dramatically increasing. It has therefore become increasing more desirable to have electronic design automation (EDA) tool enhancements that support new design rules. This is especially so for standard cells on lower metal layers of a complex integrated circuit design, which tend to suffer a significant number of design rule violations (DRVs) due to difficulties in accessing pins.

Pin accessibility becomes one of the major problems to be solved before beginning a routing stage of the design process. In order to tackle the pin accessibility problem, some solutions have focused on enhancing pin accessibility during the layout design of standard cells. However, these attempts to solve the pin accessibility problem suffer from one of two deficiencies: (1) it is undesirable to considerably redesign the cell libraries that are provided by foundries because the optimized performance and manufacturability of such cell libraries may be highly sensitive to cell layouts; (2) such attempts rely on deterministic approaches based on human knowledge, which have been shown to have a limited effectiveness in advanced nodes when attempting to solve optimization problems, such as DRV prediction and minimization, due to the extreme complexity through the overall design flow. In light of the difficulties in analyzing the complicated causes of DRV occurrences, some solutions have resorted to using machine learning-based techniques. Some such solutions have focused on support vector machines (SVM) and neural networks (NN) to predict the ability of designs to be routed. This is done by assuming that a global routing (GR) congestion map and the associated pin density are the main features to be accounted for. However, DRV occurrence is not necessarily strongly correlated with these two features. This is especially true for designs in advanced process nodes.

Accordingly, it would be advantageous to provide a system that allows a user to generate a pin pattern and predict whether the user's pin pattern is likely to have poor pin accessibility.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the disclosure. It should be noted that for clarity and ease of illustration these drawings are not necessarily made to scale.

The figures are not intended to be exhaustive or to limit the present disclosure to the precise form disclosed. It should be understood that the disclosed method and apparatus can be practiced with modification and alteration.

DETAILED DESCRIPTION

The present disclosure relates to a Pin Accessibility Prediction Engine (PAPE) that can be taught to detect whether it is likely that a particular pin arrangement (i.e., pin pattern) within a proposed integrated circuit design can be routed (i.e., electrically conductive paths can be established) to/from each pin.

The PAPE in accordance with some embodiments of the present disclosure supports users in identifying poor pin accessibility in either their own pin patterns or pin patterns of a particular design. In accordance with some embodiments disclosed herein, a pre-trained pin accessibility predictor is used to achieve this objective. Using the pre-trained pin accessibility predictor, the disclosed method and apparatus allows users to prepare their own pin patterns or designs and have the PAPE automatically identify which of the user's pin patterns have poor pin accessibility (i.e., are likely to result in design rule violations as a consequence of trying to access the pins of the design). In some such embodiments in which artificial intelligence is used, the PAPE requires training. Such training of the PAPE requires enough training data to make the prediction accurate.

Two examples of training data preparation methods to train a PAPE are disclosed. The first training data preparation methodology is a referred to herein as a "design-level" method. The second training data preparation methodology is referred to here as a "cell library-level" method.

Design-Level Training Data Preparation Method

Figure 1:
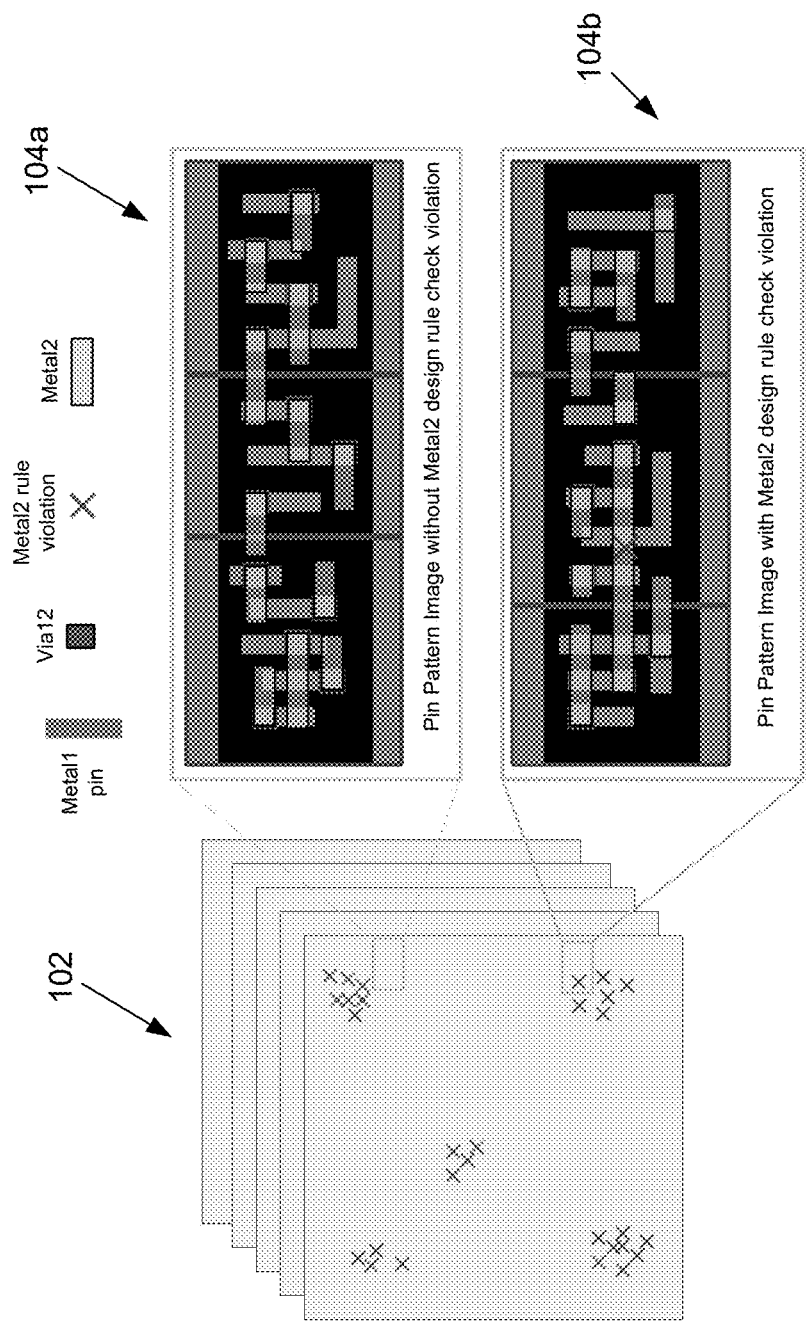
FIG. 1 is an illustration of a set of designs with pin patterns.

FIG. 1 is an illustration of a set of designs having pin patterns. Data related to a plurality of pin patterns 102 within the set of designs is used to create training data in accordance with the design-level data training method. It should be noted that some features of the drawings disclosed herein have reference designations that have a numeric portion followed by an alphabetic portion. Those features having the same numeric portion identify similar features, each uniquely identified by the alphabetic portion. When referring to all such similar features collectively, reference may be made to the numeric portion alone. For example, images of two particular pin pattern 104a, 104b are shown. The pin pattern images 104a, 104b may be collectively referenced as 104.

For the design-level training data preparation method, several "routed designs" 102 are generated to obtain pin pattern data to create a viable training data set. For the purposes of this disclosure, a routed design is an integrated circuit design layout (or portion of such) that identifies the physical layout of electrically conductive traces formed in a plurality of metal layers and "vias" connecting the layers. Vias are electrically conductive through ports through which an electrical signal can move from a conductive trace on one metal layer to a conductive trace on another metal layer. In accordance with one embodiment of the design-level training data preparation method, all the pin patterns are extracted to construct a training data set. Some of the pin patterns when routed will have design rule violations (DRVs) and others do not, thus providing a training data set from which the PAPE can learn to distinguish between the two cases.

Two such pin patterns 104 are illustrated. It can be seen that the data set comprising several routed designs 102, some of the routed designs having several metal2 rule violations (i.e., DRVs). The DRVs are indicated by a red "X". One such DRV is shown in the pin pattern image 104b. The other pin pattern 104a has no such DRV. It should be noted that for the purposes of the disclosure presented here, the particular criteria for what constitutes a DRV is not relevant, since in different embodiments of the disclosed method and apparatus, the particular criteria may vary significantly. By having a proper training data set, the distinction between those pin patterns that result in DRVs upon being routed and those that do not will be learned regardless of the criteria used to define the particular DRVs. The design-level PAPE need be trained only once using all prepared pin patterns. That is, the training for the design-level PAPE is not iterative, but is completed using a set of training data that remains constant. It should be noted that this is not to be confused with the iterative nature of the training process generally for setting the weights of the neural network, but rather merely relates to the fact that the training data remains constant through the training process.

Design-Level Convolutional Neural Network (CNN)-Based Model

The objective of the PAPE is to identify whether a pin pattern of a target design is likely to invoke a DRVs or not.

In one embodiment, the PAPE uses a design-level convolutional neural network (CNN)-based architecture taught through a training data set attained from pin patterns within a user generated design or set of designs.

Figure 2:
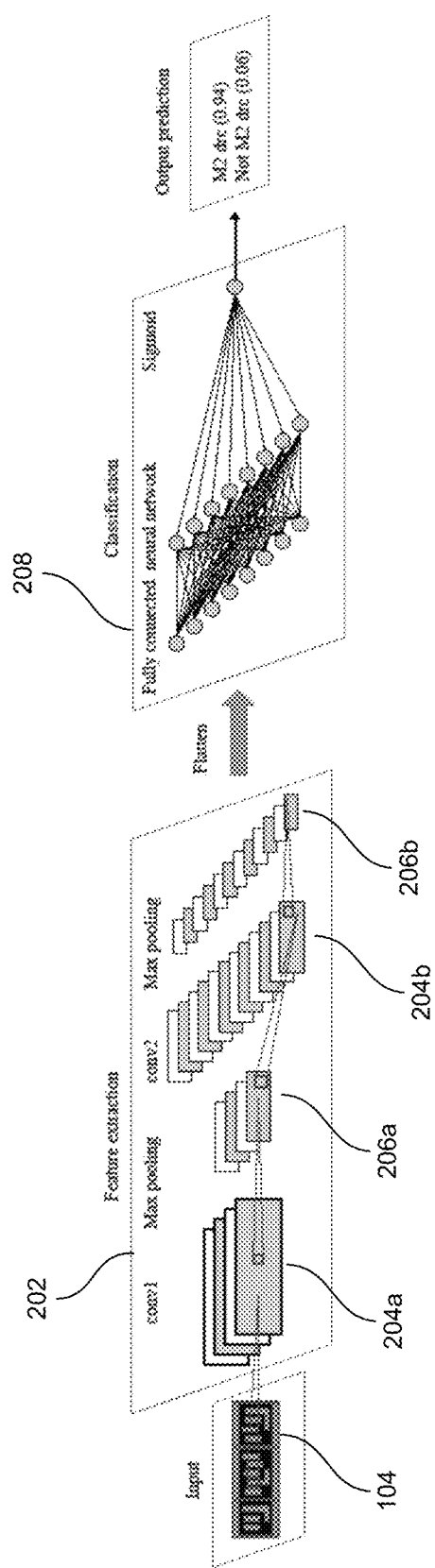
FIG. 2 graphically illustrates one training flow (e.g., set of procedural steps) that can be used to train the design-level CNN-based pin accessibility predictor.

FIG. 2 graphically illustrates one training flow (e.g., set of procedural steps) that can be used to train the design-level CNN-based pin accessibility predictor. Initially, all the pin patterns 104 to be input as training data are "quantified". Quantification involves pixelating each pin pattern and assigning a numeric value to each pixel. Pixelation is a process in which the pin pattern is divided into "pixels" by applying a grid overlay.

Figure 3:
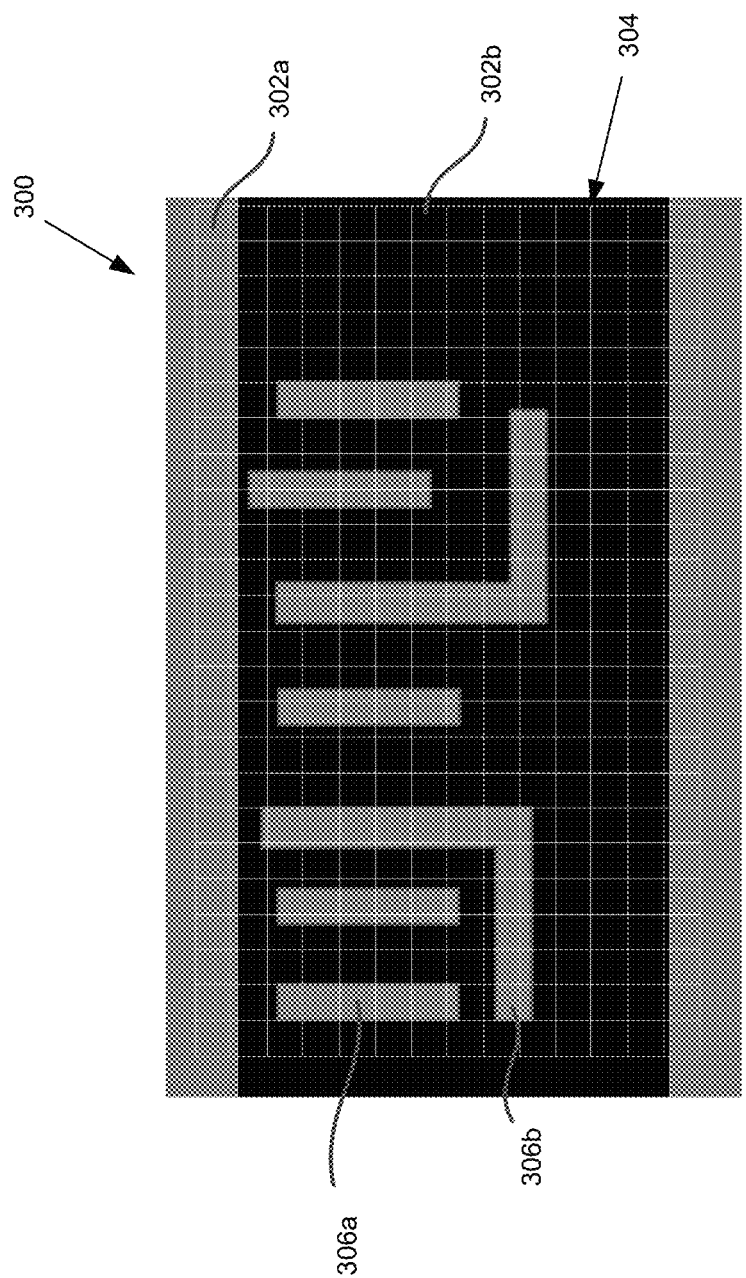
FIG. 3 is an illustration of a pin pattern that has been pixelated.

FIG. 3 is an illustration of a pin pattern 300 that has been pixelated. A grid overlay 304 defines the perimeter of each pixel 302 (24×14 such pixels 302 shown) within the pin pattern 300. The number of pixels typically depends upon the size of the pin pattern to be pixelated and the size of each pixel. The width and the height of each pixel 302 are set equal to or less than the minimum spacing of pins of the M1 layer (a first metal layer in the integrated circuit) in order to prevent a pixel 302 from being occupied by two different pins.

Figure 4:
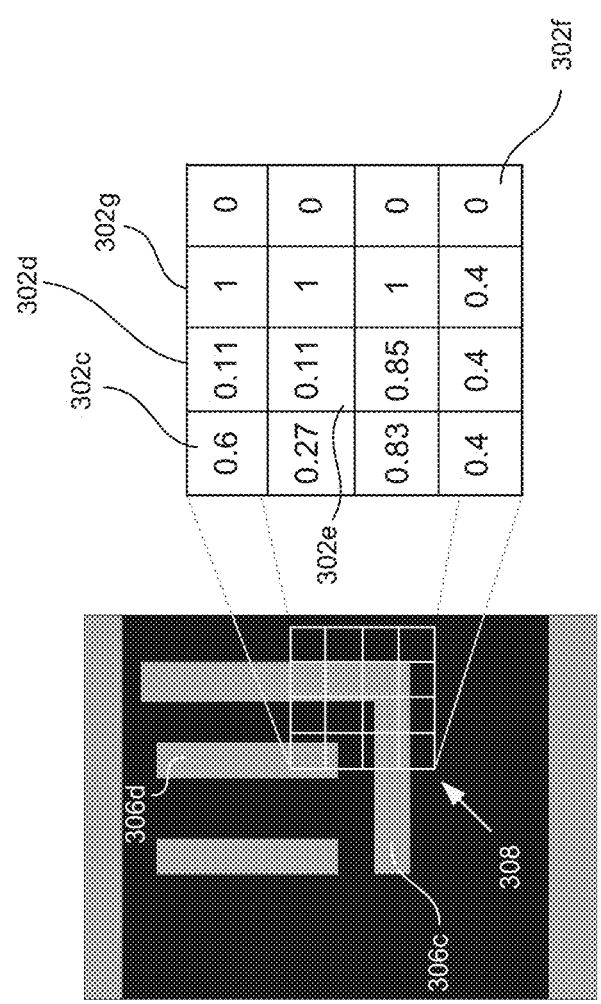
FIG. 4 is an illustration of a pixel array comprising a block of 16 pixels.

FIG. 4 illustrates one method for quantifying a pin pattern. Initially, each pin pattern is split into pixels 302 by overlying the grid 304, as shown in FIG. 3. Each pixel 302 is assigned a value equal to the "occupied pin ratio" for that pixel 302. The occupied pin ratio of a pixel 302 is computed as the relative amount of the pixel 302 that is occupied by a pin 306 with respect to the entire area of the pixel 302. That is, the occupied pin ratio can be computed as the area of the pixel 302 that includes the pin 306, divided by the total pixel area.

For example, referring to FIG. 4, pixel array 308 comprises a block of 16 pixels 302. A first pixel 302c located in the upper left corner has 60% of the pixel area covered by a pin 306c. Accordingly, the value of the pixel 302c is equal to 0.6. Similarly, 11% of the next pixel 302d (the pixel 302d to the right of the pixel 302c in the top row) is occupied by the pin 306c. Also, 11% of the pixel 302e (just below pixel 302d in the second row from the top and the second column from the left) is occupied by the pin 306c and so has a quantified value of 0.11. The pixel 302f at the bottom right corner of the array 304 has no pin within its boundary. Accordingly, that pixel 302f has a quantified value of zero. In a last example, the pixel 302g (to the right of the pixel 302d) is completely occupied by the pin 306c, and so has a value of 1.0.

Upon quantifying the pixels (i.e., determining the quantified values of each pixel), feature extraction is performed on the pixel values representing the input pin patterns. During feature extraction 202, representative features are extracted. After feature extraction the output is flattened. Features are extracted by two convolutional layers 204 interleaved with two max pooling processes 206. The convolutional layers 204 extract the critical characteristic features of the training pin patterns 104 based on the quantified values of the pixels 302 representing those pin patterns and trainable filters within the feature extraction block 202. In some cases, critical characteristic features are identified by the trainable filters within the convolutional layers 204.

Pooling 206 is done by grouping pixels together in blocks and assigning one collective value to the block. For example, in "max pooling", the value of a block of pixels in a 4 pixel by 4 pixel block may be assigned the value of the pixel having the maximum value from among the 16 pixels in the block. Pooling is commonly used to filter out noise and reduce the number of parameters. This allows the processes to focus on those parameters that are representative of features of interest.

Figure 5:
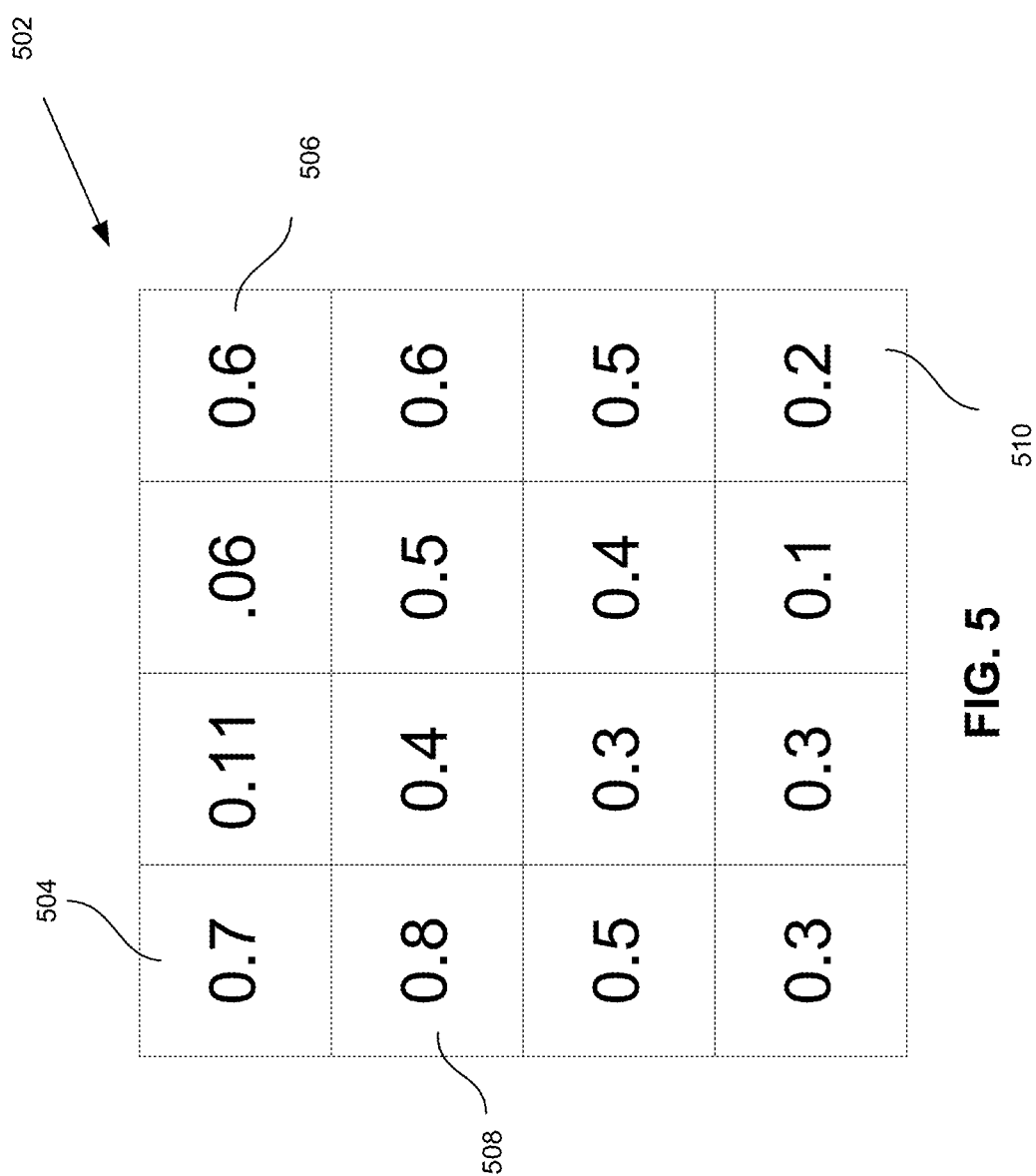
FIG. 5 is an illustration of a 4×4 block of pixels.

FIG. 5 is an illustration of a 4×4 block 502 of pixels 302. The values constitute a 4×4 two dimensional matrix. In the example shown in FIG. 5, a pixel 508 has a value of 0.8. Since that pixel has the greatest value from among the 16 pixels in the block 502, the value of the block 502 would be set to 0.8 by the max pooling process.

Once the feature extraction is completed, all extracted features are flattened. Flattening takes the data that is in a two dimensional matrix and converts it to a one dimensional array.

Figure 6:
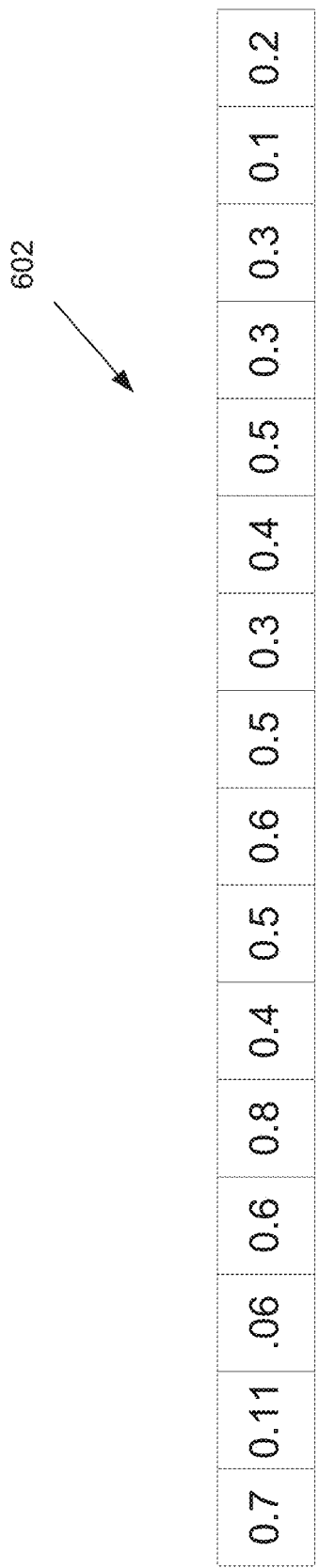
FIG. 6 is an illustration of the values of the block after they have been flattened.

FIG. 6 is an illustration of the values of the block 502 after they have been flattened. The flattened values form a one dimensional array with values starting with 0.7 in pixel 504 and ending with 0.2 in pixel 510. Each row of the two dimensional matrix 502 is placed end to end to form the one dimensional array 602. For example, the pixel 506 having the value 0.6 at the end of the top row is placed adjacent to the pixel 508 at beginning of the second row having a value of 0.8. Similarly, the pixel at the beginning of the third row is placed adjacent the pixel at the end of the second row and the pixel at the beginning of the fourth row is placed adjacent the pixel at the end of the third row.

The flattened features are then input to a processor, such as a trainable processing engine having a plurality of inputs for receiving input data representing the integrated circuit design pin pattern (e.g., the flattened values), such as a fully connected neural network within a classifier 208 for classification. The classification block includes a fully connected neural network and a sigmoid function. The fully connected neural network is a deep neural network (DNN) containing several layers of neurons to provide more levels of abstraction for complicated features. In some embodiments, the sigmoid function is applied as the final layer of a binary classification solution, which is used to scale the output a single value that falls within a range from 0 to 1 stored in a memory. By scaling, the output determination associated with each pin pattern is placed within the same range. This allows one predefined threshold to be applied to all outcomes and thus assists the model in deciding whether a given input pin pattern will induce a DRV or not based on whether the value exceeds the predefined threshold value. For example, in some embodiments, if the output value is greater than 0.5, the model will regard a given input pin pattern as a DRV candidate. Throughout this disclosure, the term "model" is used to refer to the particular state of the CNN (i.e., the CNN having a particular set of weights applied to the feature extraction filters in the convolutional layers 204, as well as the weights of the nodes in the fully-connected neural network in the classifier 208 (see FIG. 2).

Cell Library-Level Training Data Preparation Method

The second training data preparation methodology is a cell library-level procedure. Instead of generating several routed designs 102 before training the pin accessibility predictor, cell libraries are used to generate pin patterns. In contrast to the routed designs 102 used to create the training data for the design-level training data method, which may include several hundreds or thousands of cells, the pin patterns used to train the PAPE in the cell library-level training data method are automatically generated. Some of the generated pin patterns have DRVs and others do not. The generated pin patterns are then used to train the pin accessibility predictor.

Figure 7A:
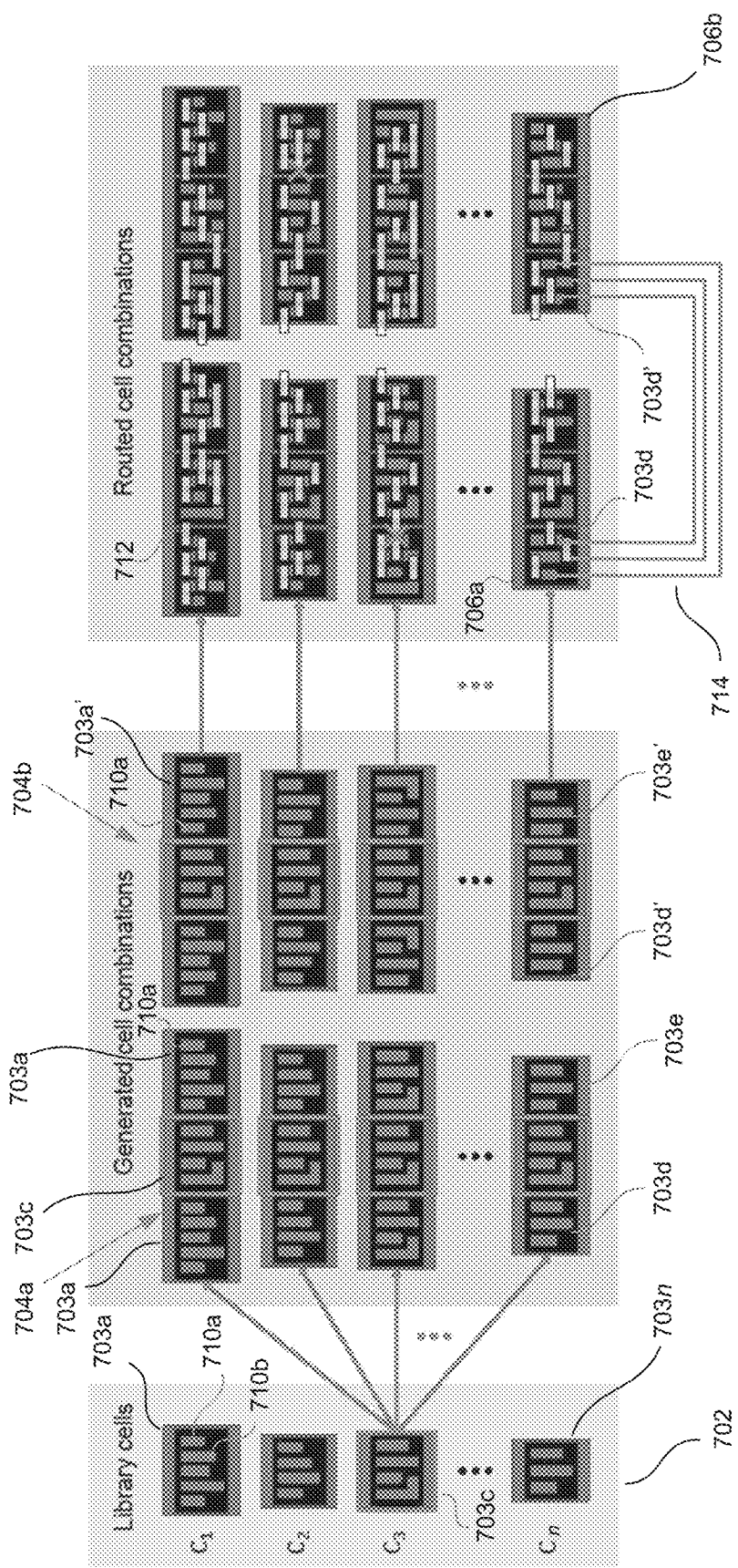
FIG. 7A is an illustration of a cell library in which a plurality of cells are stored.

FIG. 7A is an illustration of a cell library 702 in which a plurality of cells 703 are stored. Unrouted cell combinations 704 and routed cell combinations 706 are generated from the cells 703 in the cell library 702. The cell library 702 is shown to have n cells 703, four of which are shown explicitly. It should be noted that the "n" subscript shown in italics with reference to cell 703n indicates a variable n and does not imply that there are 13 such cells ("n" being the thirteenth letter in the alphabet).

Unrouted cell combinations have only the pins 710. Routed cell combination 706 have metal conductors 712 routed between the pins 710, only some of which are shown in the illustration of FIG. 7A. For example, connections between the pins in the routed cell combination 706a are shown "schematically" connected to similar pins of the routed cell combination 706b. That is, the lines 714 do not illustrate the actual route of the metal connections between the pins, but rather just schematically illustrate which pins are connected together. A further discussion of the manner in which the pin patterns 703, 706 are generated is provided below. Each of the generated unrouted cell combinations 704 and routed cell combinations 706 provide a pin pattern configuration that is used to generate training data for the cell library-level data training procedure.

Cell Library-Level Active Learning-Based Model

The cell library-level PAPE is iteratively trained, due to the randomness of pin patterns generated from the given cell libraries. In some embodiments, the training of the cell library-level PAPE is done using an active learning-based approach.

Figure 8:
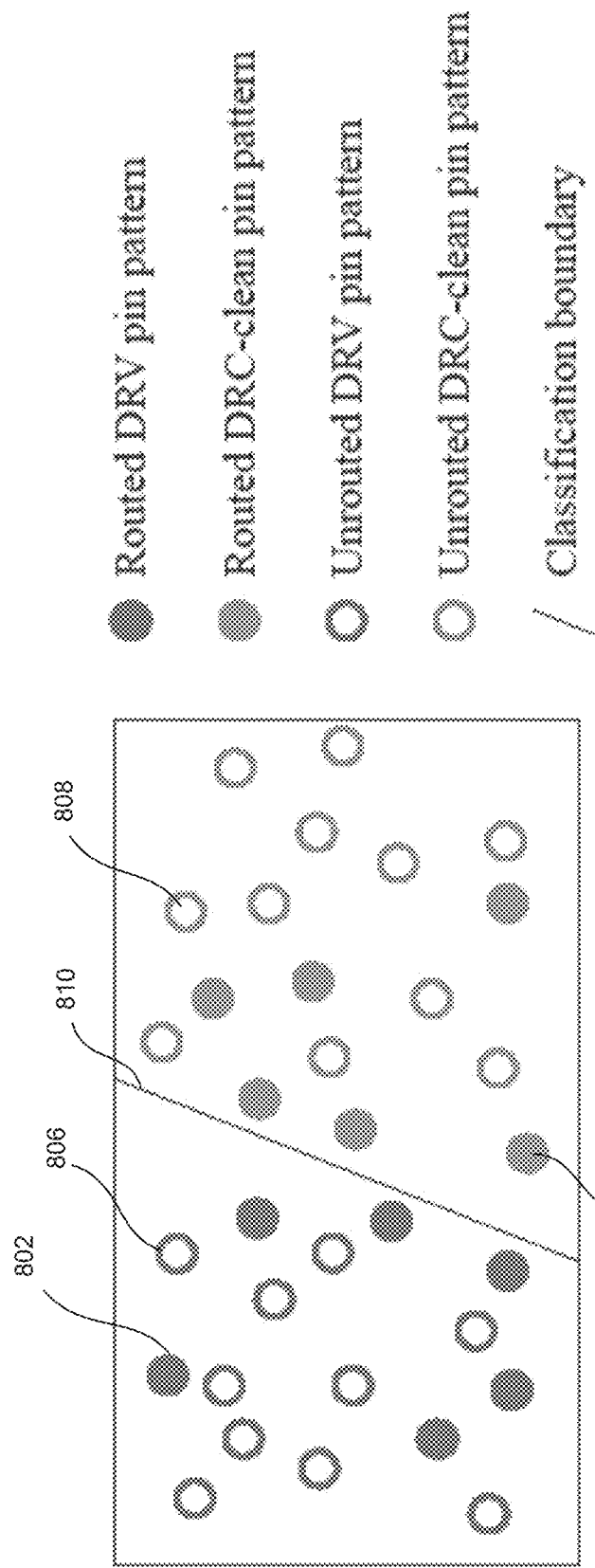
FIG. 8 graphically illustrates some basic concepts of active learning.

FIG. 8 graphically illustrates some basic concepts of active learning. The red solid points 802 represent routed pin patterns having DRVs. The green solid points 804 represent routed pin patterns that are clean of DRVs. The red hollow points 806 represent unrouted pin patterns having DRVs, and the green hollow points 808 represent unrouted pin patterns that are clean of DRVs. As noted above, each of these pin patterns are generated from the cell library. The main objective is to train the model using a relatively small number of routed pin patterns, while maintaining a result that provides a good classification boundary 810 to distinguish pin patterns 802, 806 having DRVs from those pin patterns 804, 808 that are clean of DRVs.

Figure 9:
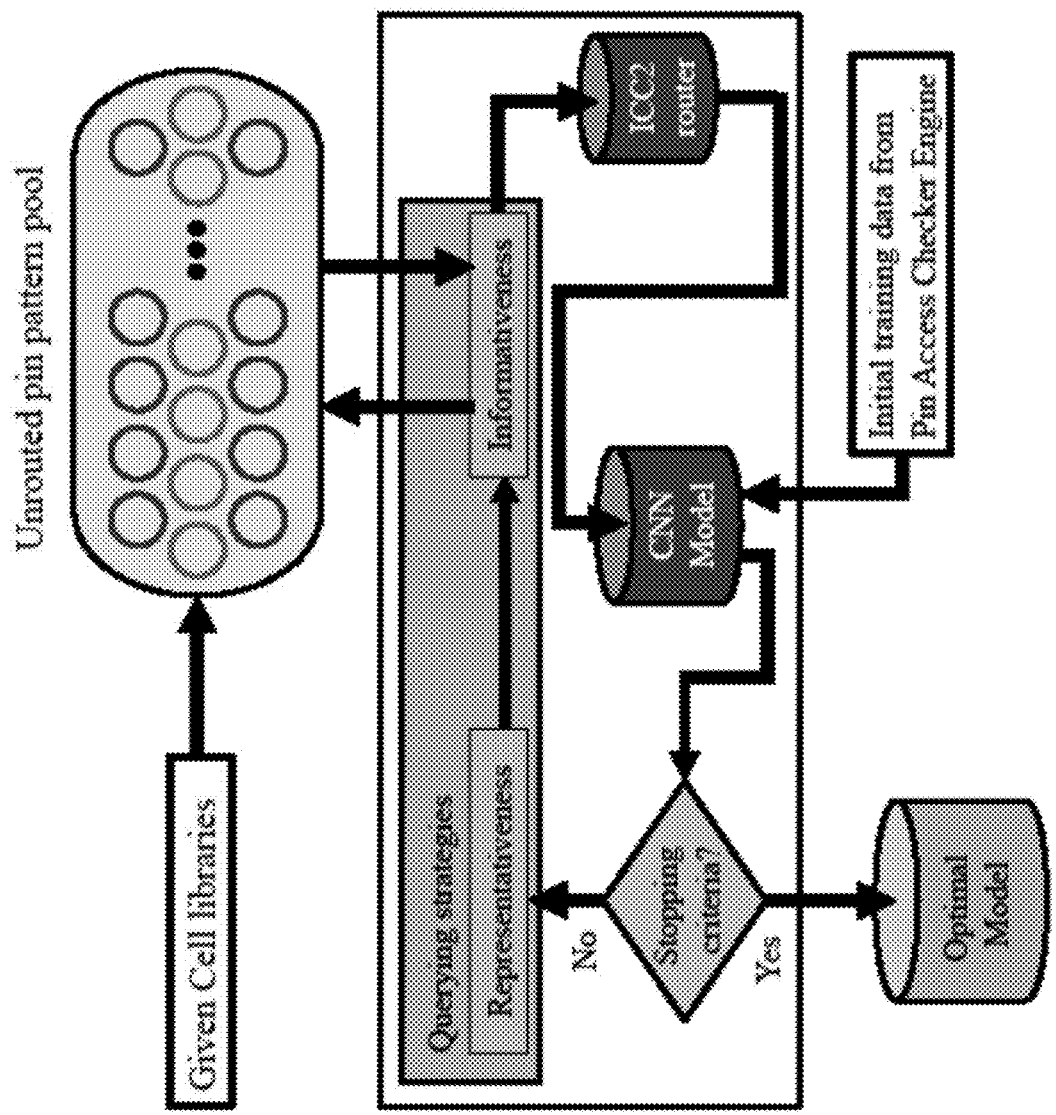
FIG. 9 illustrates the active-learning method.

FIG. 9 illustrates the active-learning method.

Training Initial Model

In the initial model training stage, a Pin Access Checker Engine generates simple cell combinations. These simple cell combinations provide pin patterns to be used in the training process. Each cell in the given cell library is first positioned to the middle of each cell combination of a set of cell combinations. The cell combinations are created by abutting different types of cells to the two sides of the given cell.

FIG. 7A provides a graph illustration of how one of the cells 703 of the cell library 702 is used to generate some of the pin patterns 704, 706 from which training data will be drawn. This process will be repeated for a plurality (and in some embodiments, all) of the cells of the cell library 702. In the example shown in FIG. 7A, a cell 703c is applied to the Pin Access Checker Engine. It can be seen that each of the cells 703a through 703n has a different pin pattern. For example, the cell 703a has five pins 710 (710a, 710b and three other pins that are not labeled with reference designations for the sake of reducing the amount of clutter in the figure). Upon selecting the cell 703c to be applied to the Pin Access Checker Engine, a set of cell combinations 704 are generated. Each of the cell combinations 704 is generated by selecting a second cell 703 from the cell library and placing the second cell on one side of the first cell 703c. For example, a first unrouted cell combination 704a is generated by taking the cell 703c and placing the cell 703a to the right. In the example, the same cell 703a is also placed to the left of the cell 703c. Accordingly, the cell combination 704a comprises a copy of the cell 703c sandwiched between two copies of the cell 703a. In other cell combinations not shown, each of the three cells 703 may have a different pin pattern.

A second cell combination 704b is then generated by "flipping" the orientation of the two cells on either side of the central cell 703c (i.e., both copies of the cell 703a on either side of the cell 703c) so that the pin 710a that was on the right side of the cells 703a is now on the left side of each of the cells 703a'. Accordingly, the flipped cells 703' of the cell combination 704b are the mirror image of the cells 703 of the cell combination 704a.

Figure 10:
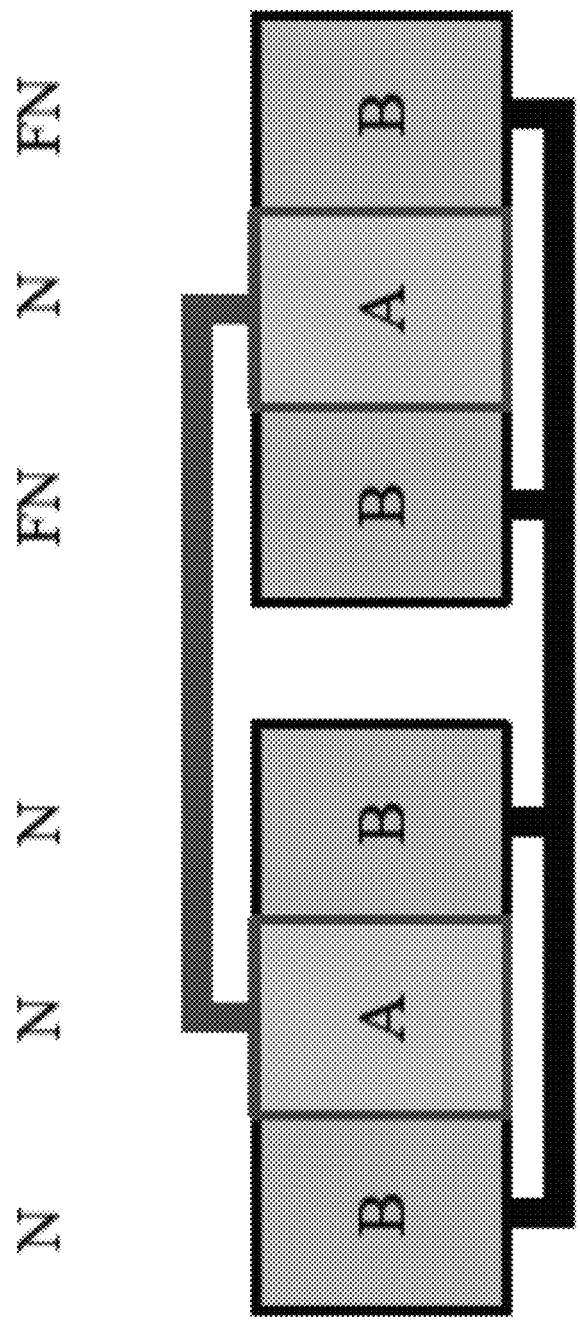
FIG. 10 illustrates the interconnections and orientations of the cells in a cell combination.

FIG. 10 illustrates the interconnections and orientations of the cells in a cell combination. The cells in the original orientation are labeled with "N" for "north" orientation, as opposed to being labeled with an "S" for "south" orientation (see FIG. 13) in which the cell is rotated 180 degrees (i.e., upside down). The cells that have been "flipped" are labeled with "FN" for "flipped north" orientation. The FN orientation is a mirror image of the N orientation.

By generating cell combinations 704b that have the same cells, but in which the orientation of some of the cells has been changed, the pin count of identical cell types (i.e., those cells with the same pin pattern, whether having the same or different orientations) will be the same. Accordingly, the interconnection can be easily defined by connecting each of the pins of the cell 703d of the cell combination 706a with a same pin in the cell 703d' of the cell combination 706b, as shown by the lines 714. As noted above, the lines 714 only show the connections, but not the layout of the conductors used to make the connections.

Orienting the cells, as shown by N and FN orientations, avoids violating the power grid (PG) rail constraints. Finally, all cell combinations are placed into a "prepared empty" design to complete the detailed routing. The prepared empty design is merely a design framework into which the cell combinations can be placed to complete a design to be used in the training. After obtaining all routed cell combinations and providing corresponding DRV labels, this data is then applied to train the initial model. Labeling is the process of classifying training data by distinguishing whether the data represents a pin pattern that has good pin accessibility or one that has poor pin accessibility.

Query Strategies

In embodiments that rely on active learning, it is necessary to extract the critical pin patterns from the group of pin patterns generated from the cell library. A pin pattern is considered to be "critical" if it provides information that assists in training the PAPE to distinguish between pin patterns that have good pin access and pin patterns that do not have good pin access. Selecting critical pin patterns is done by selecting an appropriate query strategy. The active learning approach trains the PAPE iteratively. That is, initial training data is used to perform initial training on the PAPE. After the first pass through the training, queries are done to identify cell combinations that have the greatest ambiguity (i.e., those for which a determination is least certain). Since they are labeled (i.e., the answer from the attempt to determine whether they have good pin accessibility or poor pin accessibility is known), adjustments to the training are made to improve the PAPE outcome.

Accordingly, a query strategy is used to identify which cell combinations 704 (see FIG. 7A) to use in each iteration of the training process. The accuracy of the trained PAPE will depend upon the query strategy used. Identifying which cell combinations 704 to use in the training process, determines how successful the active learning methodology will be (i.e., whether the training process for the PAPE will result in a PAPE that can accurately distinguish between a pin pattern that is likely to have good pin accessibility and one that is likely to have poor pin accessibility). By properly selecting cell combinations 704 as having pin patterns likely to have poor accessibility or a good accessibility, the training is more likely to result in a PAPE that accurately distinguishes between pin patterns that are likely to have good pin accessibility and poor pin accessibility.

The query strategies are composed using representativeness and informativeness as the criteria. Representativeness, generally speaking, refers to the degree to which essential characteristics of a subject are similar to the characteristics in a target to which the subject is sought to be matched (e.g., how well the pin pattern reflects the salient features of a pin pattern has either good or poor accessibility). In the present method and apparatus, representativeness is used to determine the number of routing queries for each combination of cells. The basic idea is that for cells that are more likely to induce a DRV, more routing queries are performed. Each routing query is a particular layout of the routing of the electrical connections between the pins 710 of a particular cell combination 704 (i.e., a routed cell combination 706). Accordingly, there may be several routed cell combinations 706 based on the same underlying unrouted cell combination 704 (i.e., having the same pin pattern).

The following equation is used to compute the DVR probability ($DP_i$) for each cell $C_i$:

$$DP_i = \frac{D_i}{D_i + ND_i} \qquad \text{EQ. 1}$$

The following equation is used to compute the Query Priority ($QP_i$) for each cell $C_i$:

$$QP_i = DP_i - \frac{\sum_{j=1}^{N} DP_j}{N} \qquad \text{EQ. 2}$$

The following formula is used to compute the Query Number ($QN_i$) for each cell $C_i$:

$$QN_i = R \times \frac{sig(QP_i)}{\sum_{j=1}^{N} sig(QP_j)} \qquad \text{EQ. 3}$$

Where: $DP_i$ denotes the DRV probability of $C_i$;
 $D_i$ denotes the number of DRVs;
 $ND_i$ denotes the number of non-DRVs;
 $QP_i$ denotes the query priority of $C_i$;
 N denotes the number of cells;
 $QN_i$ denotes the relative number of routing queries that should be performed for $C_i$;
 $C_i$ denotes the particular cell;
 R denotes the amount of resources (i.e., the total number of routing queries) that are available in the design into which the cell combinations are to be placed; and
 sig( ) denotes a sigmoid function applied to normalize the value to a range from 0 to 1.

Figure 11:
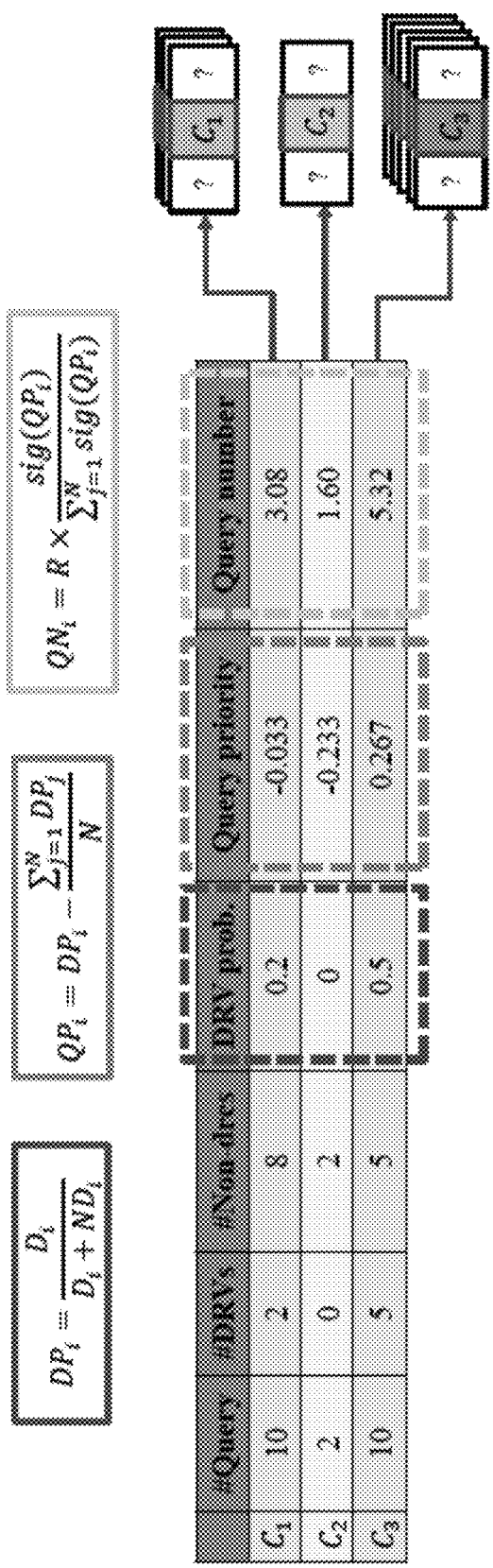
FIG. 11 gives an example of computing a relative number of routing queries for three particular cells.

FIG. 11 gives an example of computing a relative number of routing queries for three particular cells, $C_1$, $C_2$, and $C_3$. In the example shown, 10 routing queries were performed for the first cell $C_1$. This is indicated by the value "10" in the column labeled "#Query". Of the 10 queries that were performed, DRVs were present in 2, as indicated by the value "2" in the column labeled "#DRVs". Accordingly, the number of non-DRCs (queries in which there was no DRV) is equal to the other 8 from the total of 10 queries, as indicated by the value "8" in the column labeled "#Non-drcs". Accordingly, the probability that a DRV is present, as calculated by applying EQ. 1, is 20% or 0.2, as indicated by the value "0.2" in the column labeled "DRV prob.".

A query priority $QP_i$ is then calculated by comparing the average DRV probability to the DRV probability for the particular cell at issue. For example, the average $DP_i$ is calculated by applying the equation EQ. 2. The sum of the values calculated for the $DP_i$ of each of the three cells is divided by the N (where N is the number of cells total in the process; 3 in the example shown). The average $DP_i$ is then subtracted from the $DP_i$ for the particular cell at issue, i.e., $DP_i$ for the first cell. In this example, that means that for the first cell $C_1$, the sum of 0.7/3=0.233 is subtracted from 0.2. The resulting priority is then equal to 0.2-0.233=-0.033. For the second cell, $C_2$ the priority is equal to 0.0-0.233=-0.233. For the third cell, $C_3$ the priority is equal to 0.5-0.233=0.267.

Applying equation EQ. 3, the target number of queries for each cell combination is then calculated. R is the total number of queries (i.e., routed cell combinations) can be placed into a training design (i.e., the sum of all of the queries for all of the cell combinations). In the current example, R is set to 10. Accordingly, if 10 total queries can be used for the training, the goal is to select the proper ratio of queries for each cell combination. First, the query priority value for the particular cell at issue, taken from the column labeled "Query priority", is applied to a Sigmoid function. The Sigmoid function normalizes the value to place it in a consistent range for comparison with the query priority values for the other cell combinations. Next, the result of the Sigmoid function is divided by the sum of the Sigmoid result of each of the query priority values for all of the cells ($C_1$ through $C_n$, in this example, n is 3). Accordingly, the resulting ratio will indicate the percentage of queries that should be included for the cell combination $C_i$. When multiplied by the total number of queries, R, the result of EQ. 3 is the number of queries that should be included for the cell combination $C_i$. It should be noted that the sum of the values in the column labeled "Query number" is 10, the total number of queries that can be placed in the training design. Obviously, $C_3$ required more routing queries due to the highest DRV probability. $C_1$ has the next highest probability of having a DRV, and so has the second most queries, and $C_2$ has the lowest probability of having a DRV and so the least number of queries to be placed into the test design.

After all routing queries are computed from the representativeness stage, we then move on to the informativeness stage. The informativeness stage is used to determine which of those cell combinations applied to the pre-trained model does not result in a solution with sufficient confidence that the correct DRV prediction can be obtained.

Figure 12:
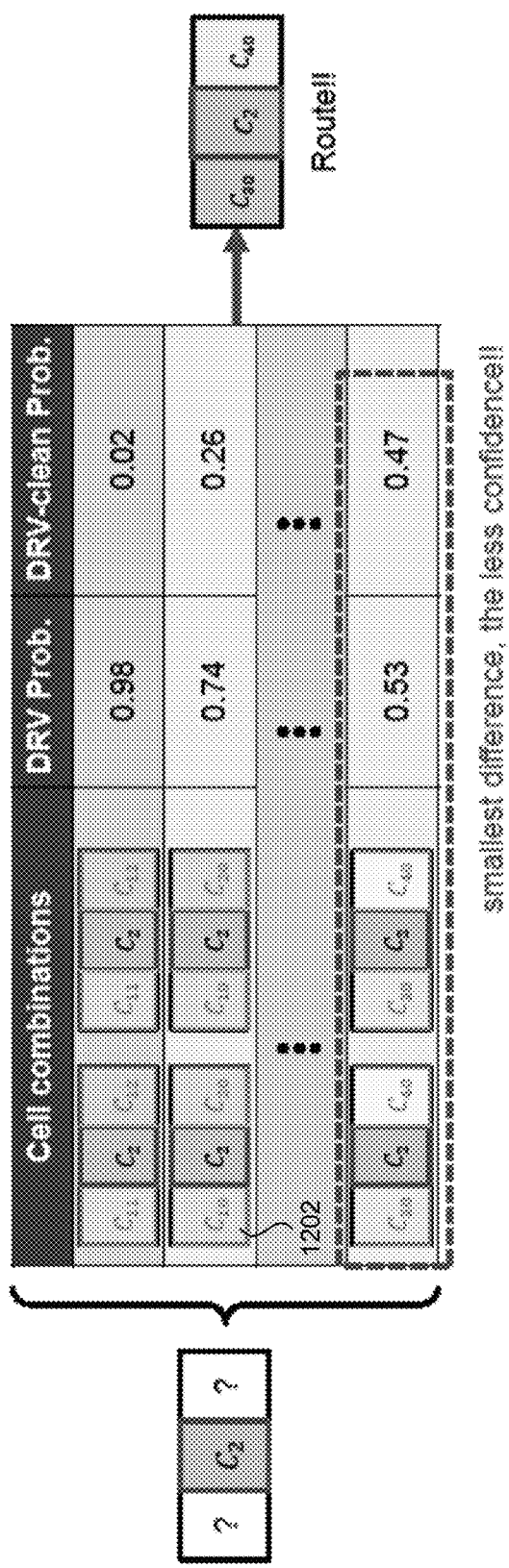
FIG. 12 illustrates an example of how informativeness is applied.

FIG. 12 takes $C_2$ introduced in FIG. 11 as an example to detail the manner in which informativeness is applied. According to the outcome of the representativeness determination for the number of routing queries $QN_2$ for $C_2$, we need to include one query (i.e., one representative routed cell combination $C_2$) to be applied to the model to re-train the model. In order to enhance the DRV predictability of pre-trained model, not only the cells abutted to each cell can be different, we also carefully choose the cell combination in which the pre-trained model has the least confidence to get the correct prediction. As shown in FIG. 12, we first randomly generate a batch of different "unseen" cell combinations 1202 of $C_2$. Then, all the unseen cell combinations 1202 are applied to the PAPE to predict whether each unseen cell combination 1202 has a DRV. Finally, the cell combination 1202 with the smallest difference between DRV probability and DRV-clean probability is chosen to be the candidate for routing, since the pre-trained model cannot precisely identify whether the cell combination will induce DRV or not. It should be noted that this probability is the result of applying the routed cell combination to the model and attaining the result, including the confidence level (i.e., probability that the result from the model will accurately classified the pin pattern as being likely to generate a DRV and the likelihood that the model will accurately classify the pin pattern as not generating a DRV).

Query Routing Results from ICC2

Figure 13:
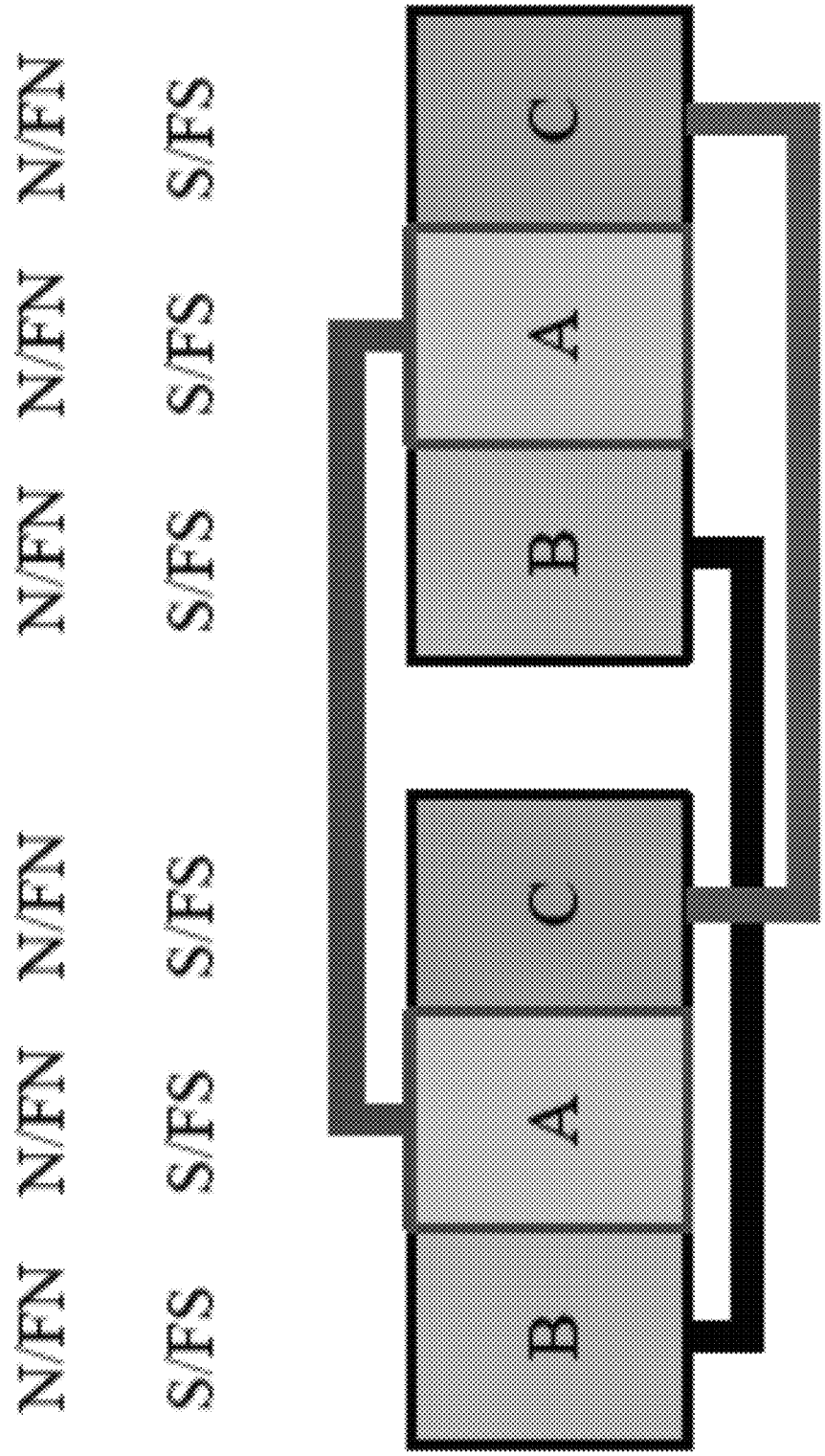
FIG. 13 indicates possible orientations of the cell.

As the informative and representative cell combinations are prepared, we then query the routing results by feeding them into an integrated circuit complier, such as the ICC2 router available from Synopsys, Inc. of Mountain View, Calif. A modified Pin Access Check Engine is used to complete all routing queries. Since the cells abutted to each cell may be different, the interconnections are redesigned as shown in FIG. 13. In FIG. 13, the reference "N/NF" indicates that the orientation of the particular cell can be either "N" or "NF" (see the discussion above with respect to FIG. 10). The reference "S/SF" indicates that the orientation of the particular cell can be either "S" (i.e., 180 degrees rotated from N), or "SF" (i.e., mirror image of N and rotated 180 degrees). The S/FS orientations increase the amount of different cell combinations in the training data set. By selecting all of the possible combinations, the data set is the most robust. Finally, all cell combinations are placed into a prepared empty design to complete the detailed routing. After obtaining all routed cell combinations with the corresponding DRV labels, we then apply these data to re-train the model. The model will be iteratively trained until the stopping criteria is triggered. Furthermore, we will apply the pre-trained model to identify the pin patterns with DRV and propose two methodologies to avoid generating such patterns during placement stage.

Model-Guided Legalization

The PAPE has the ability to identify those pin patterns with bad pin accessibility during cell legalization stage automatically. In addition, it can also take any given user-defined preferred pin patterns or forbidden pin patterns as (training) inputs to keep learning incrementally.

For example, this embodiment can obtain the exact distance of required spacing between any two neighboring cells and identify which cell combinations cannot be vertically abutted. It also can be applied to identify pin patterns with bad pin accessibility among the considered design with any given user-input pin patterns.

There are two benefits to the cell library-level pin accessibility predictor: (1) the trained pin accessibility predictor is independent of the design (it should be noted that while in some embodiments the cell library from which cells were drawn to create one or more of the pin patterns to be analyzed can also be used to create the pin patterns used to train the PAPE, the particular pin patterns used for the training may be distinct from the pin patterns to be analyzed); and (2) compared to the design-level pin accessibility predictor, the cell library-level pin accessibility predictor can be automatically trained using the pin patterns of the cell libraries. The cell library-level approach saves resources and runtime, since large numbers of routed designs are not required to generate a training data set.

Hardware Implementation

Figure 14:
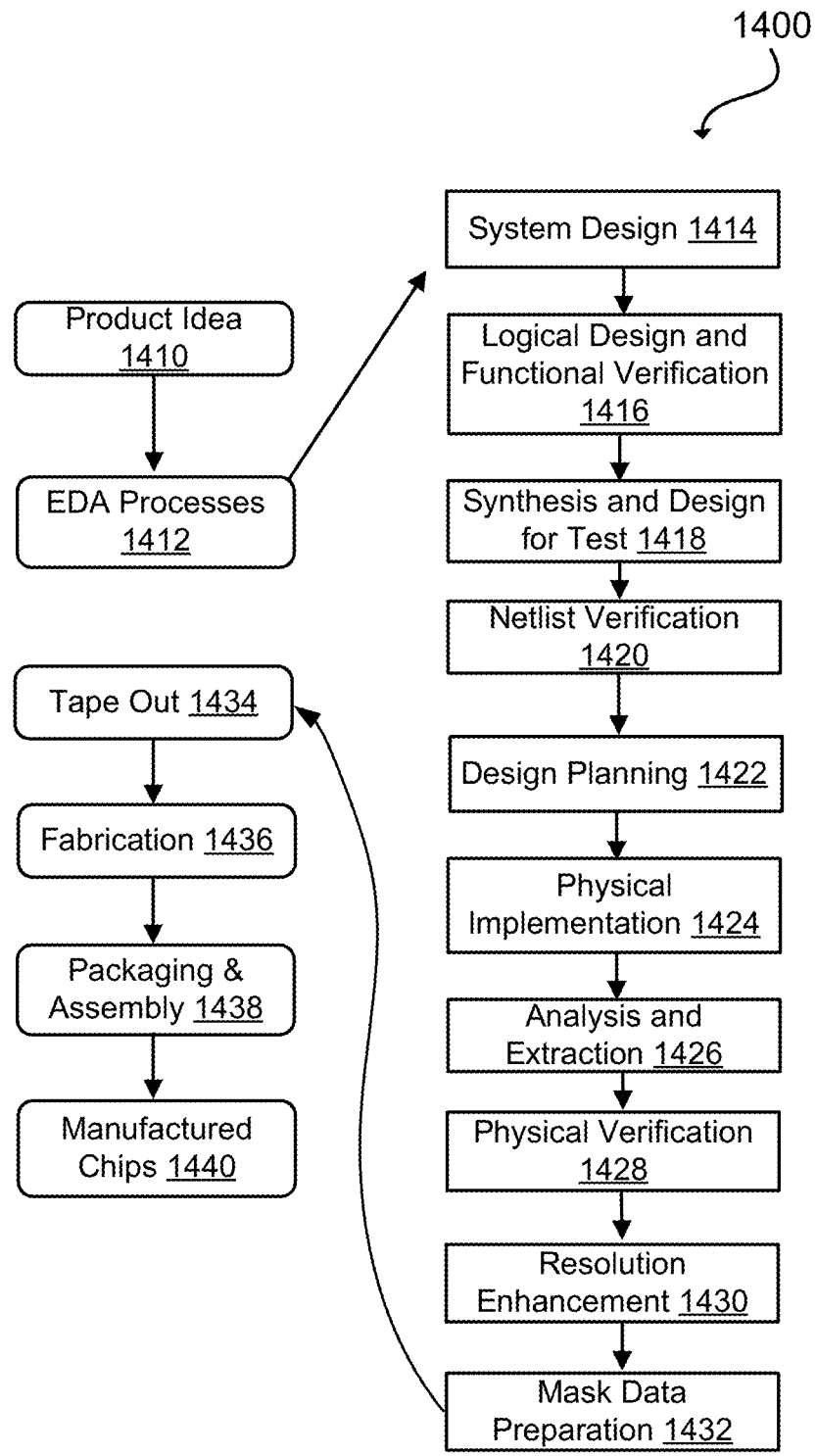
FIG. 14 illustrates an example set of processes used during the design, verification, and fabrication of an article of manufacture such as an integrated circuit to transform and verify design data and instructions that represent the integrated circuit.

FIG. 14 illustrates an example set of processes 1400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1410 with information supplied by a designer, information which is transformed to create an article of manufacture that uses a set of EDA processes 1412. When the design is finalized, the design is taped-out 1434, which is when artwork (e.g., geometric patterns) for the integrated circuit is sent to a fabrication facility to manufacture the mask set, which is then used to manufacture the integrated circuit. After tape-out, a semiconductor die is fabricated 1436 and packaging and assembly processes 1438 are performed to produce the finished integrated circuit 1440.

Figure 7B:
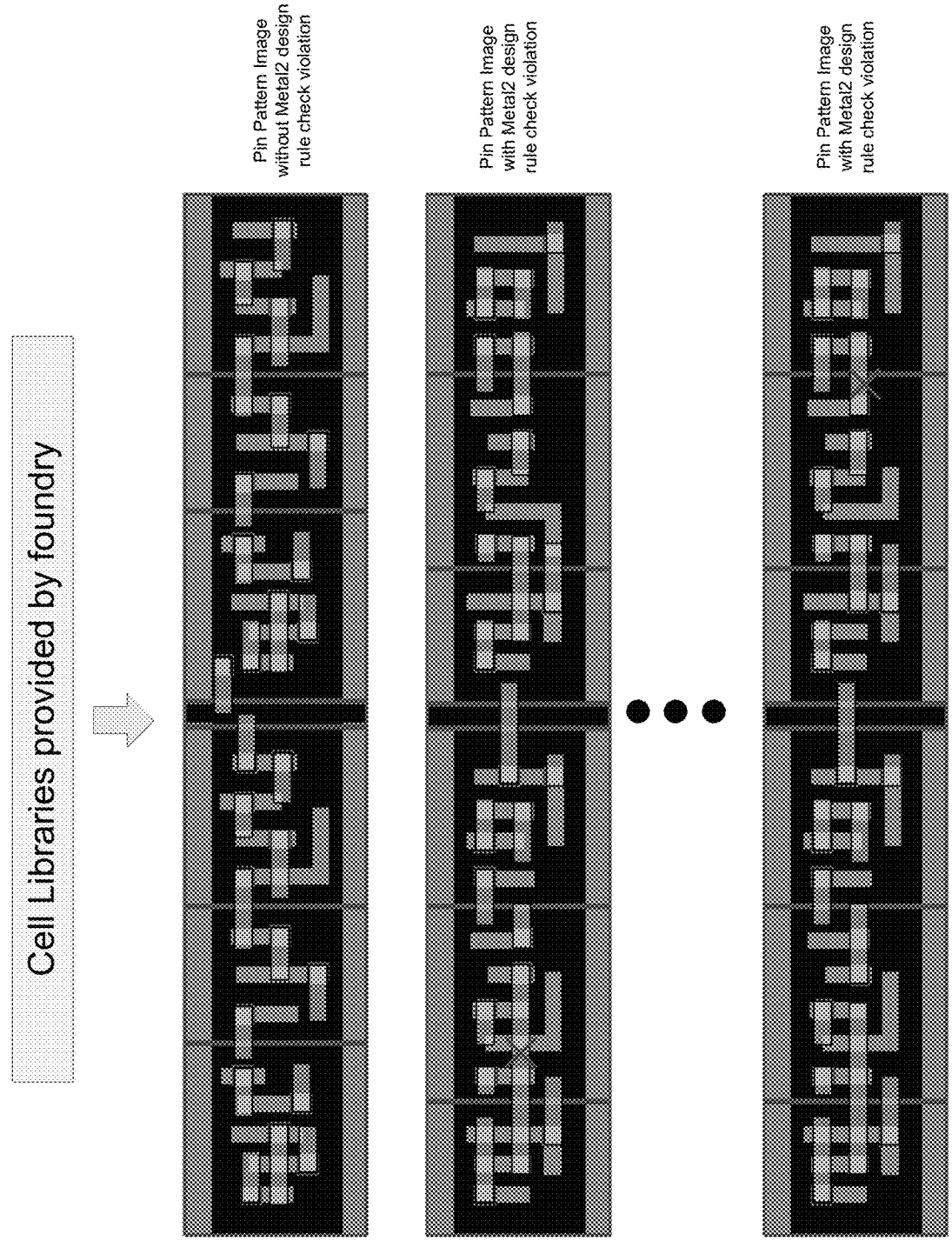
FIG. 7B illustrates the generated pin patterns used to train the pin accessibility predictor.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 7. The processes described by be enabled by EDA products (or tools).

During system design 1414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1418, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1420, the netlist is checked for compliance with timing constraints and for correspondence with the HDL code. During design planning 1422, an overall floor plan for the integrated circuit is constructed and analyzed for timing and top-level routing.

During layout or physical implementation 1424, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1426, the circuit function is verified at the layout level, which permits refinement of the layout design. During physical verification 1428, the layout design is checked to ensure that manufacturing constraints are correct, such as DRC constraints, electrical constraints, lithographic constraints, and that circuitry function matches the HDL design specification. During resolution enhancement 1430, the geometry of the layout is transformed to improve how the circuit design is manufactured.

During tape-out, data is created to be used (after lithographic enhancements are applied if appropriate) for production of lithography masks. During mask data preparation 1432, the 'tape-out' data is used to produce lithography masks that are used to produce finished integrated circuits.

A storage subsystem of a computer system (such as computer system 1500 of FIG. 15) may be used to store the programs and data structures that are used by some or all of the EDA products described herein, and products used for development of cells for the library and for physical and logical design that use the library.

Figure 15:
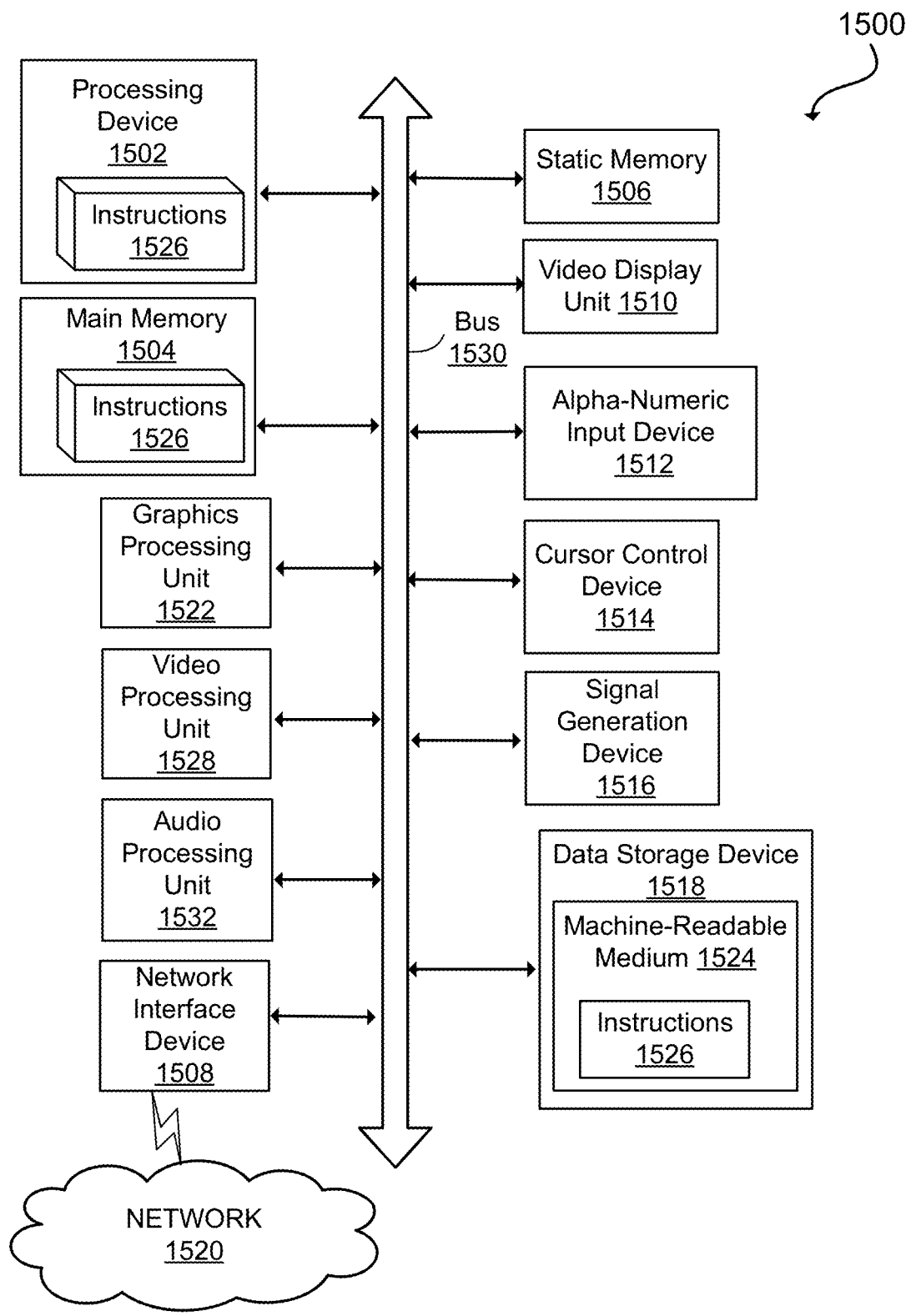
FIG. 15 illustrates an integrated circuit embodiment of the technology.

FIG. 15 illustrates an example machine of a computer system 1500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1500 includes a processing device 1502, a main memory 1504 (e.g., read-only memory (ROM), flash memory, dynamic random access memory (DRAM) such as synchronous DRAM (SDRAM), a static memory 1506 (e.g., flash memory, static random access memory (SRAM), etc.), and a data storage device 1518, which communicate with each other via a bus 1530.

Processing device 1502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. The processing device 1502 may be configured to execute instructions 1526 for performing the operations and steps described herein.

The computer system 1500 may further include a network interface device 1508 to communicate over the network 1520. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), a graphics processing unit 1522, a signal generation device 1516 (e.g., a speaker), graphics processing unit 1522, video processing unit 1528, and audio processing unit 1532.

The data storage device 1518 may include a machine-readable storage medium 1524 (also known as a non-transitory computer-readable medium) on which is stored one or more sets of instructions 1526 or software embodying any one or more of the methodologies or functions described herein. The instructions 1526 may also reside, completely or at least partially, within the main memory 1504 and/or within the processing device 1502 during execution thereof by the computer system 1500, the main memory 1504 and the processing device 1502 also constituting machine-readable storage media.

In some implementations, the instructions 1526 include instructions to implement functionality corresponding to the present disclosure. While the machine-readable storage medium 1524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

The invention claimed is:

1. A system comprising:
a) a memory:
b) a processor, coupled to the memory and having a plurality of inputs, the processor to:
receive input data representing an integrated circuit design pin pattern; and
as a result of a training process, determine whether the input data representing an integrated circuit design pin pattern is likely to incur a design rule violation upon being routed or is unlikely to incur a design rule violation upon being routed;
wherein, the training process includes using a training data set of training pin patterns, including: (1) unrouted pin patterns that are likely to incur a design rule violation upon being routed; (2) unrouted pin patterns that are unlikely to incur a design rule violation upon being routed; (3) routed pin patterns that are likely to incur a design rule violation; and (4) routed pin patterns that are unlikely to incur a design rule violation.

2. The system of claim 1, wherein training pin patterns are taken from a set of designs used to create the training data set.

3. The system of claim 1, wherein cell libraries are used to generate pin patterns included within the training pin patterns.

4. The system of claim 1, wherein the processor is a neural network.

5. The system of claim 4, wherein the input data representing an integrated circuit design pin pattern is quantified prior to being received at the inputs to the processor.

6. The system of claim 5, wherein quantified input data representing the integrated circuit design pin pattern comprises a plurality of values, each value representing an occupied pin ratio for an associated pixel.

7. The system of claim 6, wherein the plurality of values are flattened prior to being received at the inputs to the processor.

8. The system of claim 7, wherein feature extraction is performed on the occupied pin ratios for the associated pixels prior to the plurality of values being flattened.

9. The system of claim 6, further comprising a plurality of convolutional layers interleaved with a plurality of max pooling processes, wherein the convolutional layers extract critical features of training pin patterns based on quantified values of pixels representing those training pin patterns.

10. The system of claim 9, wherein the convolutional layers comprise trainable filters configured to identify critical characteristic features present in the quantified values of pixels representing those training pin patterns.

11. A method for training a pin accessibility prediction engine (PAPE) to enable the PAPE to distinguish between input data representing an integrated circuit design that is likely to incur a design rule violation upon being routed and input data representing an integrated circuit design that is unlikely to incur a design rule violation upon being routed, the method comprising:
a) generating a plurality of integrated circuit designs;
b) selecting for training the PAPE, from the generated plurality of integrated circuit designs, data representing integrated circuit pin patterns that are known to incur a design rule violation upon being routed;
c) selecting for training the PAPE, from the plurality of integrated circuit designs, input data representing integrated circuit pin patterns that are known to not incur a design rule violation upon being routed;
wherein at least some of the integrated circuit designs are taken from a design presented to the PAPE after training to determine whether the design is likely to incur design rule violations upon being routed.

12. The method of claim 11, wherein generating a plurality of integrated circuit designs includes generating several routed designs having pin patterns to obtain pin pattern data to create a viable training data set.

13. The method of claim 12, wherein all of the pin patterns used to obtain pin pattern data are extracted to create the viable training data set.

14. The method of claim 13, wherein some of the pin patterns used to obtain pin pattern data have design rule violations and some of the pin patterns used to obtain pin pattern data do not have design rule violations.

15. The method of claim 14, wherein the PAPE is trained only once using all extracted pin patterns.

16. A method for training a pin accessibility prediction engine (PAPE) comprising:
a) drawing from a cell library a plurality of standard integrated circuit cells;
b) combining the standard integrated circuit cells to form cell combinations;
c) generating labeled cell combinations by labeling the cell combinations as being either a design rule violation (DRV) cell combination or a non-DRV cell combination;
d) using the labeled cell combinations to perform an initial training of a trainable prediction engine;
e) generating a plurality of queries for cells from the cell library by routing a plurality of the cell combinations, each of the plurality of cell combination based on one of the standard integrated circuit cells from the library;
f) for each cell, applying the plurality of queries to the trainable prediction engine to determine a DRV probability for that cell;
g) from the DRV probability, determining a query priority;

h) from the query priority, determining a query number, QN that is proportional to the query priority;
i) for each cell, applying additional routing queries to the trainable prediction engine to determine the DRV probability that the query has a DRV;
j) selecting from the additional routing queries applied to the trainable prediction engine, the QN queries for which the trainable prediction engine was least confident; and
k) retraining the trainable prediction engine using the selected QN queries for each cell.

17. The method of claim 16, wherein:
cells from the cell library comprise pin patterns;
using the labeled cell combination to perform an initial training of a trainable prediction engine comprises:
 1) pixelating the pin patterns of the standard integrated circuit cells drawn from the cell library;
 2) quantifying the pin patterns by determining pixel values by computing an occupied pin ratio for each pixel of the pin patterns; and
 3) performing feature extraction on the determined pixel values to extract representative features of the pin patterns.

18. The method of claim 17, wherein using the labeled cell combination to perform an initial training of a trainable prediction engine further comprises flattening after feature extraction.

19. The method of claim 18, wherein the feature extraction is performed by two convolutional layers interleaved with two pooling processes.

20. The method of claim 19, wherein feature extraction further comprises max pooling of pixel values.

21. A system comprising:
a) a memory:
b) a processor, coupled to the memory and having a plurality of inputs, the processor to:
receive input data representing an integrated circuit design pin pattern; and
through a training process, distinguish between input data representing an integrated circuit design pin pattern that is likely to incur a design rule violation upon being routed and input data representing an integrated circuit design pin pattern that is unlikely to incur a design rule violation upon being routed, based on: a plurality of training pin patterns, including pin patterns drawn from a cell library of standard integrated circuit cells that are combined to for cell combinations; generating labeled cell combinations by labeling the cell combinations as being either a DRV cell combination or a non-DRV cell combination; using the labeled cell combination to perform an initial training of a trainable prediction engine; generating a plurality of queries for cells from the library by routing additional cell combinations, each cell combination based on one of the cells from the library; for each cell, applying a plurality of queries to the trainable prediction engine to determine the DRV probability for that cell; from the DRV probability, determining a query priority; from the query priority, determining a query number, QN that is proportional to the query priority; for each cell, applying additional routing queries to the trainable prediction engine to determine the probability that the query has a DRV; selecting from the additional routing queries applied to the trainable prediction engine, the QN queries for which the trainable prediction engine was least confident; and retraining the trainable prediction engine using the selected QN queries for each cell.

* * * * *